(No Model.)
P. GAMPHER.
EARTH AUGER.
No. 386,397. Patented July 17, 1888.
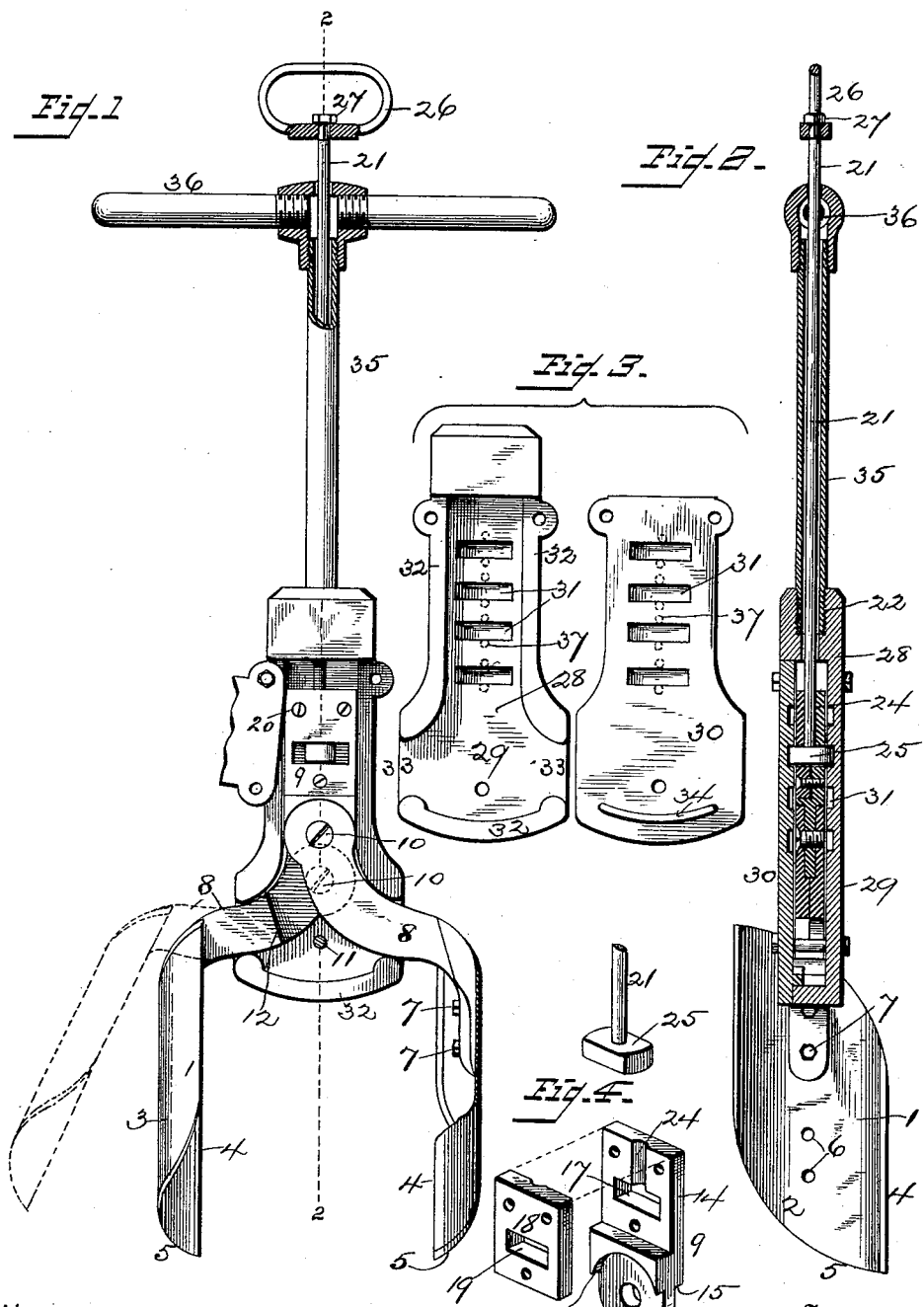

UNITED STATES PATENT OFFICE.

PAUL GAMPHER, OF TROY, OHIO.

EARTH-AUGER.

SPECIFICATION forming part of Letters Patent No. 386,397, dated July 17, 1888.

Application filed February 25, 1888. Serial No. 265,225. (No model.)

*To all whom it may concern:*

Be it known that I, PAUL GAMPHER, a citizen of the United States, residing at Troy, in the county of Miami and State of Ohio, have invented certain new and useful Improvements in Earth-Augers; and I do hereby declare the following to be a full, clear, and exact description of the invention, such as will enable others skilled in the art to which it appertains to make and use the same.

This invention relates to improvements in earth-augers.

My improved earth-auger, briefly described, consists of a pair of reversible blades or shovels of peculiar construction removably connected to a pair of arms pivotally connected together and to a block contained in and adapted to reciprocate within a box having guideways therein, along which the arms connected to the blades reciprocate and which serve to extend or contract said arms, said box having recessed faces, with which an eccentric or button on a push-rod connected to the slide engages to lock said slide and the blades and their arms in different positions, all as hereinafter set forth.

In the accompanying drawings, Figure 1 represents a front elevation of my improved earth-auger partly in section and with the top plate of the box removed. Fig. 2 represents a longitudinal section on the line 2 2 of Fig. 1. Fig. 3 represents a detail plan view of the body and top of the box, looking at the inner faces thereof. Fig. 4 represents detail perspective views of the slide, the respective sections thereof being separated to show the construction thereof, and of the lower portion of the slide operating and locking rod.

My improved auger is designed for use in boring or digging post-holes, though it may be employed for digging holes in the earth generally and for other purposes.

The cutting or boring blades or shovels 1, of which there are two, are of sheet-steel or other suitable metal, and are each of outwardly-curved form, so as to present a concave inner face, 2, and a convex outer face, 3. They are each formed with a straight cutting-edge, 4, on each side and with vertically-extending curved ends 5, also having a cutting-edge. These cutters or shovels, it will be seen, are reversible, so that when one end or cutting-edge becomes worn or injured the cutter may be removed from its support and turned end for end thereon.

6 represents one or more holes formed in the boring-blade adjacent to each end thereof, through which bolts, rivets, or other suitable devices, 7, may be passed to connect them to their adjusting-arms.

8 represents a pair of curved arms, to whose lower ends the cutting blades 1 are removably attached. These arms are formed of malleable iron or other suitable metal and are at their upper ends pivotally connected together and to the slide 9 by a pivot-pin, 10, so as to permit of their being rocked or oscillated to or from each other in a horizontal direction, so as to either increase or diminish their distance from each other, and thereby regulate the area over which they shall extend in their cutting or boring operations, whereby the area or circumferential size of the hole to be bored is regulated. The contiguous faces of these arms for a suitable distance from their pivotal connection outwardly are recessed, as at 11, to permit of their free passage over or across each other in their rocking movements, the abutments 12 thereon, when the cutting-blades are closed, impinging against the adjacent arm and serving as stops to prevent the blades striking each other.

The slide 9, to which the rocking arms 8 and the operating-rod, to be presently described, are attached, is formed in two parts—viz., a bottom recessed part, 14, having at its bottom portion shoulders 15 15, against which the upper ends of the curved arms 8 have bearing in their reciprocatory movements, an extension, 16, to which said arms are pivoted, and in its body portion a transverse slot, 17, and an upper part, 18, adapted to fit within and close the recessed bottom portion of the slide, and having a slot, 19, similar to the slot 17 and registering therewith, as shown. The two parts 14 17 of the slide are secured together by rivets, screws, or other suitable devices, 20.

21 represents the slide-operating rod, and consequently the means whereby the arms and blades are adjusted. This rod extends through a vertical hole, 22, in the upper end of the slide-inclosing box or case, to be presently described, to and through a vertical hole, 24, in the slide. To the lower end of this rod is secured a button or eccentric, 25, which, with the rod, is placed in position within the slide when the top thereof is removed, so as to place the eccentric within the slotted portions of said slide. When so placed in position, the top 18 of the slide is secured in position whereby the eccentric is held from withdrawal, yet permitted to rotate therein. The upper end of the slide-operating rod 21 is screw-threaded, to which is connected a hand-grasp, 26, by means of which the rod and slide may be reciprocated and the rod and eccentric rotated within the slide, said hand-grasp being removably held in place by a nut, 27.

28 represents the box or case within which the slide 9 and the curved arms 8 are contained and reciprocate. This box or case may either have a solid bottom portion, 29, and a removable top or lid, 30, as represented in the drawings, or may be of more open construction, as desired. As represented, its inner bottom face and the inner face of the removable top or lid are each provided with a series of grooves, 31, transversely in line with or opposite to each other when the box is closed, and with which, as the slide is reciprocated to adjust the degree of opening of the arms 8 and blades 1, the eccentric engages to hold said slide, arms, and blades rigid and lock them in the desired position. When it is desired to adjust the blades to a given extent of opening, the operator grasps the hand-grasp and reciprocates the rod by either pushing it down or pulling it up, as the case may be, which act causes the slide 9 to correspondingly reciprocate within the box 28 and either draw in or force outward the curved arms 8 and the thereto-attached blades 1. When the desired position or extent of opening has been secured to the arms and blades, the operator turns the hand-grasp and rod around, which act causes the eccentric to correspondingly turn and engage the grooves in the top and bottom, respectively, of the box, and thereby lock the rod, slide, and parts connected therewith from movement until the rod is again turned to release the eccentric from its locking position.

In lieu of forming a series of grooves in the bottom and top of the box, a single longitudinal groove may be formed in each, which will fully answer the same purpose as a series of grooves would; or, in lieu of a groove or grooves in the box, lugs, pins, or projections 37 may be formed therein or attached thereto, with which the eccentric will engage when turned into locking position. From the bottom plate of the box, extend, at right angles thereto, side and bottom wings, 32, to which the top or lid 30 is bolted or otherwise removably connected. A curved slot or passage-way, 33, is formed in the lower end of the box, between the side and bottom wings or flanges, within which the arms 8 rest and reciprocate. As the rod reciprocates the slide within the box, the arms 8 will, by reason of their curvature and of the curvature of the recessed portion of the box within which they rest, be automatically either drawn in and retracted or forced out and expanded as the slide is either drawn up or pushed down within the box, and as said arms so move the blades or cutters 1 connected thereto will be correspondingly either retracted or expanded.

Suitable flanges, as 34, are formed on the inner face of the box-lid to insure its fitting closely and lessening the necessity of the employment of bolts for connecting it and the body of the box together.

35 represents a pipe or tube secured at its lower end to the upper end of the box or case. To the upper end of this pipe or tube is removably attached a handle, 36, by means of which the auger may be revolved when boring. The slide-operating rod 21 passes through this tube or pipe 35 and through a hole extending vertically through the center of the handle 36.

By my improved auger I am enabled to readily and speedily adjust its extent of boring capacity and to securely lock the blades at any desired degree of extension. By reason of the form and construction of the blades as represented I am enabled to always bore a straight-sided hole. By reason of the shape and ready adjustability of the blades I am enabled to easily and expeditiously change them end for end, and thus very materially lengthen the life of the cutters.

My improved auger is adapted for varied uses. It can be profitably employed in boring wells, boring for water when wells have gone dry, digging post-holes and boring earth generally, boring and removing sugar, cement, &c., from hogsheads, and in a variety of other ways.

What I claim is—

1. An auger having reversible blades or cutters.

2. An auger having reversible outwardly-curved blades or cutters provided with straight-cutting side edges.

3. An auger having reversible outwardly-curved blades having straight-cutting side edges and vertically-curved ends.

4. An auger having reversible blades having straight-cutting side edges and curved ends.

5. An auger having reversible blades or cutters, curved arms removably connected thereto and pivotally connected together, an inclosing-case having side openings in its lower portion, a slide connected to said arms, and a rod adapted to reciprocate said slide within the case for the purpose of securing the expansion and contraction of said arms and the thereto-connected cutters, substantially as set forth.

6. An auger comprising a box or case, a slide having bearing therein, a rod adapted to reciprocate said slide, curved arms pivotally connected to said slide, reversible cutting-blades removably connected to said curved arms, and means for rotating the auger.

7. An auger comprising a shell or case having grooves or projections on its inner faces and side openings therein, means for rotating said shell or case, a slide contained within said case and having a transverse slot therein, a rod connected to and adapted to reciprocate said slide, a turnable button or eccentric secured to the lower end of said rod and adapted to engage the grooves or projections in the case or shell, curved arms pivotally connected to said slide, and cutting-blades secured to the lower ends of said curved arms.

8. An auger comprising a shell or case, a slide contained therein, cutting-blades, arms pivotally connected together and to said slide and attached to said cutting-blades, a rod for rotating said auger, and a rod adapted to reciprocate said slide and expand and contract the cutting-blades and arms connected thereto and lock the same in position.

9. An auger comprising a shell or case having curved guideways in its lower end, an operating-rod connected to said case, a slide contained within said case, a plurality of curved arms pivotally connected together and to said slide at their upper ends, a plurality of reversible cutters removably connected to the lower ends of said curved arms, a rod connected to said slide for the purpose of reciprocating the same, a slide-lock adapted to be operated by the rod connected to the slide, and lock-engaging devices carried by said shell or case, substantially as set forth.

10. An auger having a plurality of boring or cutting blades, arms connected thereto and pivotally connected together, a slide connected to said arms and adapted to reciprocate the same and cause the expansion and contraction thereof and of the thereto-connected cutters, a shell or case inclosing said slide, and a lock adapted to hold said arms and cutters in their adjusted positions.

11. An auger comprising a box or shell having lock-engaging devices in its interior, a two-part slide contained within said box and having in the inner faces of its respective sections a vertical groove to receive the slide-reciprocating rod, a transverse slot extending through said sections and a bottom extension, a plurality of blades or cutters, arms connected at their lower ends to said blades and at their upper ends pivotally connected together and to the extension on the slide, a slide-operating rod connected with said slide and having at its lower end a slide-locking eccentric or button, and an auger-operating rod, all substantially as and for the purpose set forth.

12. In an auger, the combination, with a plurality of cutters, cutter-carrying arms, a slide to which said said arms are pivotally connected, and a slide-operating rod, of a box or case adapted to receive said slide and arms and permit of their reciprocation therein, and consisting of a bottom portion having flanged sides and outwardly-extending ears or flanges, and a lid having similar ears or flanges, connecting-bolts or similar devices securing said eared portions of the box together, and an auger-operating rod, substantially as set forth.

In testimony whereof I affix my signature in presence of two witnesses.

PAUL GAMPHER.

Witnesses:
A. F. BROOMHALL,
C. J. HARR.